United States Patent [19]
Lin

[11] Patent Number: 5,389,462
[45] Date of Patent: Feb. 14, 1995

[54] STORAGE BATTERY

[75] Inventor: Hsien-Chih Lin, Tainan City, Taiwan, Prov. of China

[73] Assignee: Ztong Yee Industrial Co., Ltd., Taiwan, Prov. of China

[21] Appl. No.: 154,876

[22] Filed: Nov. 17, 1993

[51] Int. Cl.$^6$ .............................................. H01M 2/02
[52] U.S. Cl. ........................................ 429/121; 429/7;
429/65; 429/175; 429/180; 439/135; 439/136; 439/149
[58] Field of Search .................... 429/65, 121, 7, 175, 429/180; 439/149, 135, 136

[56] References Cited
U.S. PATENT DOCUMENTS 4,619,873 10/1986 Ishikura et al. ...................... 429/48

Primary Examiner—Stephen Kalafut
Assistant Examiner—M. Nuzzolillo
Attorney, Agent, or Firm—Christie, Parker & Hale

[57] ABSTRACT

A storage battery has a top end which is provided with a depression to receive a pair of sockets that are connected electrically to negative and positive terminal ends of the storage battery, and a protective cover lid that covers the top end. The depression is opened at one side thereof to permit access into the same. The cover lid has a plug seat which is formed therethrough. A fuse plug is received in the plug seat and has two legs which extend slidingly into the sockets. The cover lid further has a shielding plate to deny access into the depression.

3 Claims, 2 Drawing Sheets

5,389,462

STORAGE BATTERY

BACKGROUND OF THE INVENTION

1. Field of the Invention

The invention relates to a storage battery more particularly to the structure of a top end of the storage battery and a cover lid for covering the top end.

2. Description of the Related Art

FIG. 1 shows an exploded view of a conventional storage battery that includes a container 11 which has a top end 12 and a protective cover lid 13 which is provided on the top end 12 so as to cover the same. As best illustrated, the top end 12 has two recesses 19 formed therein from which positive and negative terminal ends 15 extend so as to connect with a connector 17. The top end 12 is further provided with a depression 14 that has a bottom on which two sockets 16 are mounted. The sockets 16 are connected respectively and electrically to the positive and negative terminal ends 15 of the storage battery. The protective cover lid 13 has a through-hole 133. A plug seat 131 extends from the periphery of the through-hole 133 and is received in the depression 14. The plug seat 131 confines two passages 132 therethrough which permit extension of two legs 181 of a fuse plug 18 so as to enable the latter to engage slidingly the sockets 16 when the fuse plug 18 is plugged into the plug seat 131 of the protective cover lid 13.

It is known that the sockets 16 are welded in the depression 14 of the top end 12 of the conventional storage battery. The surrounding wall which defines the depression 14 can create some inconveniences when performing a welding operation thereat.

SUMMARY OF THE INVENTION

The main objective of the present invention is to provide a storage battery which has a top end with a particular structure to facilitate the provision of sockets thereat.

Accordingly, the construction of a storage battery of the present invention is similar to that of the conventional storage battery except that the depression which is formed on the top end of the storage battery is confined by a surrounding wall that has an opening to permit access to the depression, and that the protective cover lid has a shielding plate which extends substantially perpendicularly therefrom and which shields the opening to deny access into the depression.

During mass production, the top end of a battery container is produced with the depression which is defined by a surrounding wall that has two opposed walls and an intermediate wall which interconnects the opposed walls to define the surrounding wall. The opening is formed opposite to the intermediate wall and facilitates the provision of a pair of sockets in the depression of the top end of the storage battery. The sockets are connected respectively and electrically to the negative and positive terminal ends of the storage battery. The protective cover lid has a plug seat formed therethrough to receive a fuse plug that has two legs which extend slidingly into the sockets, thereby completing an electric circuit.

BRIEF DESCRIPTION OF THE DRAWINGS

Other features and advantages of the present invention will become more apparent in the following detailed description of the preferred embodiment with reference to the accompanying drawings, in which.

DETAILED DESCRIPTION OF THE PREFERRED EMBODIMENT

Figure 1:
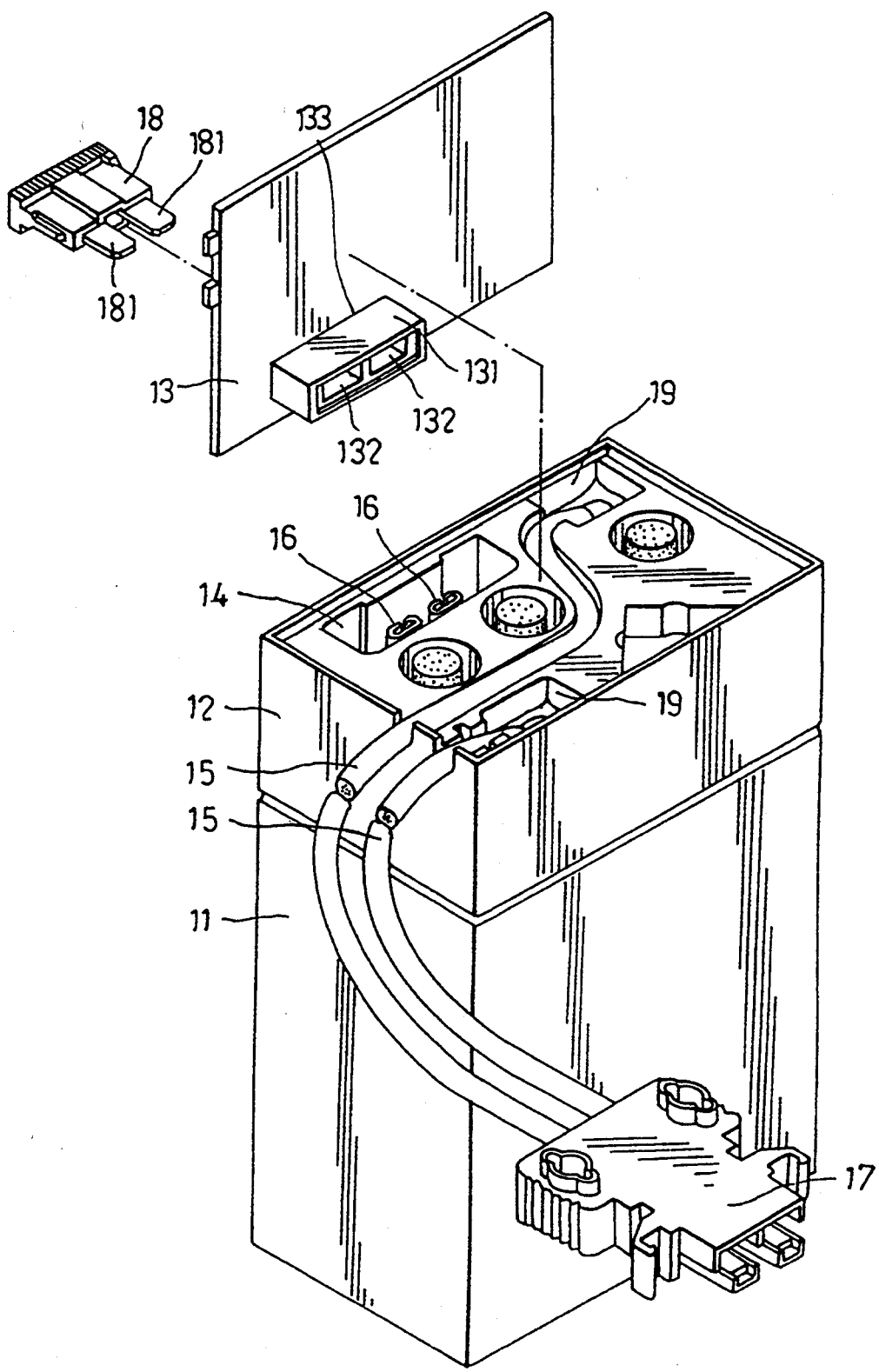
FIG. 1 shows an exploded view of a conventional storage battery.
Figure 2:
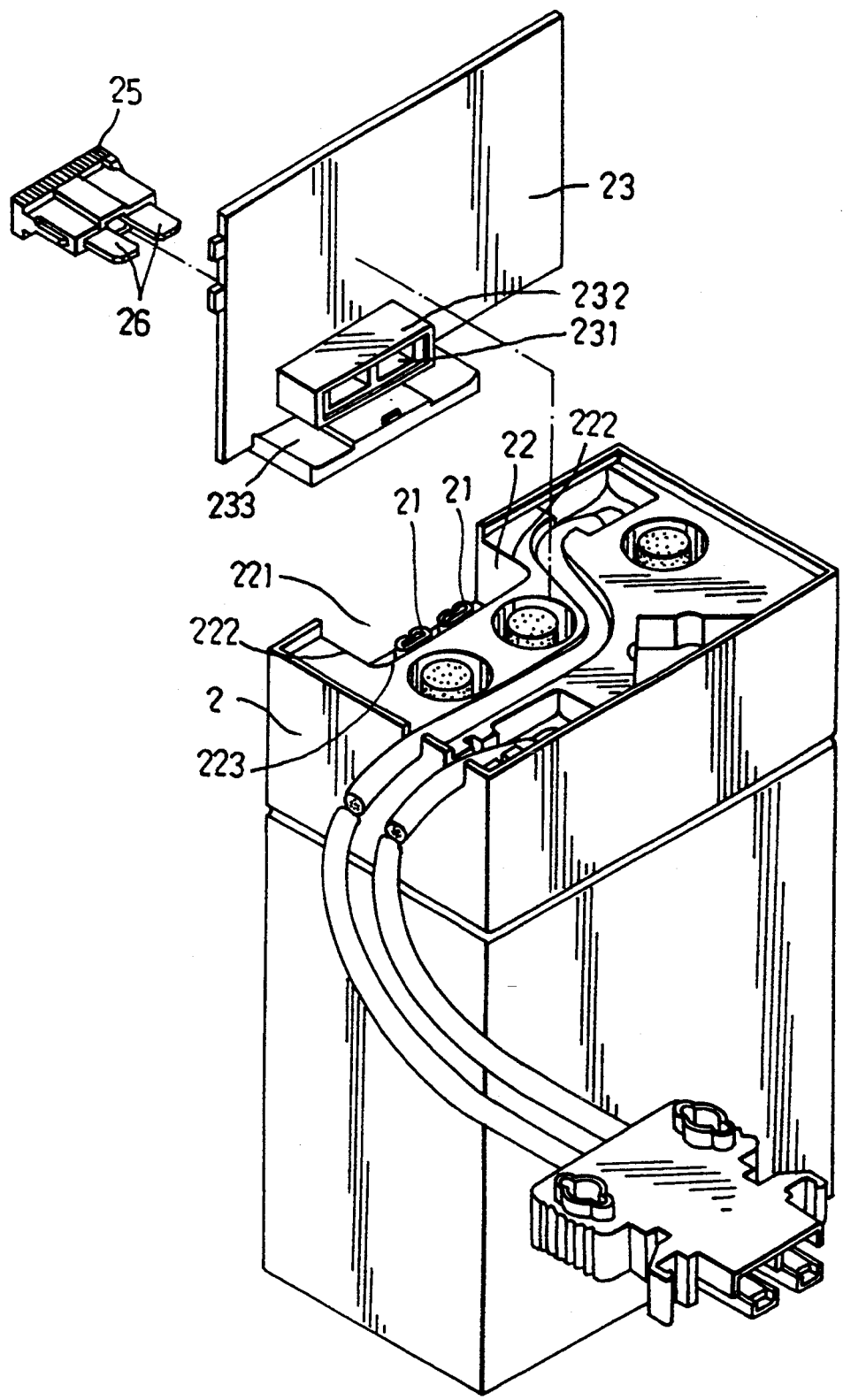
FIG. 2 shows an exploded view of a storage battery of the present invention.

Since the construction of a storage battery according to the present invention is generally similar to that of the conventional storage battery shown in FIG. 1, only the characterizing parts of the present invention will be described herein.

The storage battery of the present invention has a top end 2 which has a depression 22 that is confined by a surrounding wall which has two opposed walls 222 and an intermediate wall 223 that interconnects the opposed walls 222 to form the surrounding wall, and an opening 221 which is formed opposite to the intermediate wall 223. Since the opening 221 permits easy access into the depression 22, mounting of a pair of sockets 21 in the depression 22 by means of welding is facilitated.

The protective cover lid 23 is the same as that of the conventional storage battery except that, to complement the structure of the depression 22, the protective cover lid 23 has a shield plate 233 which extends perpendicular from cover lid 23 and which shields the opening 221 of the depression 22 when the protective cover lid 23 is fixed securely on the top end 2 of the storage battery.

The protective cover lid 23 has a through-hole with a plug seat 232 which confines two passage holes 231 therethrough. A fuse plug 25 is received in the plug seat 232 and has two legs 26 which pass through the passage holes 231 of the plug seat 232 and which extend slidingly into the sockets 21. Since the sockets 21 are connected respectively to the positive and negative terminal ends of the storage battery, the fuse will open when an electric current that exceeds a bearable range passes through the fuse plug, thereby preventing damage to the storage battery of the present invention.

While a preferred embodiment has been explained and described, it will be apparent that many changes and modifications can be made in the general construction and arrangement of the present invention without departing from the scope and spirit thereof. Therefore, it is desired that the present invention be not limited to the exact disclosure but only to the extent of the appended claims.

I claim:

1. In a storage battery including a top end which has a depression formed adjacent to a periphery of said top end and a cover lid for covering said top end, said depression having a bottom on which two sockets are mounted, said socket being connected respectively to positive and negative terminal ends of said storage battery, said cover lid having a through-hole to receive a fuse plug therethrough such that two legs of said fuse plug extending slidingly into said sockets;

the improvement comprising: said depression being confined by a surrounding wall which has an opening to permit access into said depression, said cover lid having a shielding plate extending perpendicular from the cover lid to shield said opening.

2. The storage battery as defined in claim 1, wherein said surrounding wall includes two opposed walls and an intermediate wall which interconnects said opposed walls to define said surrounding wall, said opening being formed opposite to said intermediate wall.

3. A method for assembling a storage battery including a top end which has a depression formed adjacent to an edge of said top end and a lid for covering said top end, said depression defining a top opening and a side opening that provide access into said depression, said depression having a bottom on which two sockets are mounted, said sockets being connected respectively to positive and negative terminal ends of said storage battery, said lid having a through-hole to receive a fuse plug therethrough such that two legs of said fuse plug extend slidingly into said sockets, said lid having a shielding plate extending perpendicular from it to shield said side opening, the method comprising the steps of:

fitting the lid to the top end portion of the battery such that the top end portion of the battery covers the top opening and the shielding plate covers the side opening; and attaching the lid to secure the lid to the top end in the position as fitted.

* * * * *